(12) United States Patent
Righi et al.

(10) Patent No.: US 7,895,914 B2
(45) Date of Patent: Mar. 1, 2011

(54) COMMAND DEVICE FOR A BICYCLE GEAR CHANGE

(75) Inventors: Ermanno Righi, Modena (IT); Sandro Montanari, Formigine (IT)

(73) Assignee: F.S.A. S.R.L., Busnago (IT)

( * ) Notice: Subject to any disclaimer, the term of this patent is extended or adjusted under 35 U.S.C. 154(b) by 1159 days.

(21) Appl. No.: 11/587,515

(22) PCT Filed: Apr. 29, 2005

(86) PCT No.: PCT/IB2005/001232

§ 371 (c)(1),
(2), (4) Date: Oct. 24, 2006

(87) PCT Pub. No.: WO2005/068283

PCT Pub. Date: Jul. 28, 2005

(65) Prior Publication Data

US 2007/0227287 A1  Oct. 4, 2007

(30) Foreign Application Priority Data

May 6, 2004  (IT) .................... MO2004A0106
Apr. 15, 2005 (IT) ........................... MOV0037

(51) Int. Cl.
*F16C 1/10* (2006.01)
(52) U.S. Cl. ................................... 74/502.2
(58) Field of Classification Search ............ 74/473.13, 74/473.14, 473.15, 500.5, 501.6, 502.2
See application file for complete search history.

(56) References Cited

U.S. PATENT DOCUMENTS

| 4,504,250 | A |   | 3/1985  | Juy |
| 4,676,118 | A |   | 6/1987  | Leiter |
| 4,731,046 | A |   | 3/1988  | Juy |
| 4,876,913 | A |   | 10/1989 | Romano |
| 4,905,537 | A |   | 3/1990  | Nagano |
| 5,052,241 | A |   | 10/1991 | Nagano |
| 5,222,412 | A |   | 6/1993  | Nagano |
| 5,257,683 | A | * | 11/1993 | Romano ..................... 192/217 |
| 5,622,083 | A |   | 4/1997  | Kirimoto et al. |
| 5,755,139 | A |   | 5/1998  | Kojima |
| 5,799,542 | A |   | 9/1998  | Yamane |
| 5,806,372 | A | * | 9/1998  | Campagnolo ............ 74/473.14 |
| 5,829,313 | A | * | 11/1998 | Shahana ..................... 74/502.2 |
| 5,921,138 | A |   | 7/1999  | Kojima et al. |

(Continued)

FOREIGN PATENT DOCUMENTS

EP  0 352 733 A2  1/1990

(Continued)

*Primary Examiner*—Vicky A Johnson
(74) *Attorney, Agent, or Firm*—Pearne & Gordon LLP (57) ABSTRACT

A command device for a bicycle gear change, comprising: a rotating drum (2) provided with a rotation axis (x) and being predisposed to rotate in opposite directions in order to wind at least a portion of a change-activating cable (3) on a lateral surface of the rotating drum (2); means for rotating, predisposed on command to rotate the rotating drum (2) in opposite directions according to predetermined angular steps; means for retaining predisposed to hold the rotating drum (2) in a position in absence of commands made to the means for rotating. The rotation axis (x) of the rotating drum (2) is perpendicular with respect to an advancement direction of the bicycle, that is, parallel to the rotation axis of the front wheel of the bicycle.

16 Claims, 7 Drawing Sheets

U.S. PATENT DOCUMENTS

| | | |
|---|---|---|
| 6,450,060 B1 | 9/2002 | Shahana |
| 6,453,764 B1 | 9/2002 | Ose |
| 2001/0012978 A1* | 8/2001 | Jinbo et al. .................. 701/70 |
| 2002/0033064 A1 | 3/2002 | Ose |
| 2002/0033065 A1 | 3/2002 | Ose |
| 2002/0035885 A1 | 3/2002 | Ose |
| 2002/0035886 A1 | 3/2002 | Ose |
| 2002/0104401 A1* | 8/2002 | Dal Pra .................... 74/502.2 |
| 2002/0124679 A1* | 9/2002 | Dal Pra .................... 74/502.2 |
| 2003/0167870 A1 | 9/2003 | Ose |

FOREIGN PATENT DOCUMENTS

| | | |
|---|---|---|
| EP | 0 863 069 A2 | 9/1998 |
| EP | 1 134 158 A2 | 9/2001 |
| FR | 2 701 917 A1 | 9/1994 |

* cited by examiner

COMMAND DEVICE FOR A BICYCLE GEAR CHANGE

TECHNICAL FIELD

The invention relates to a command device for a bicycle gear change.

BACKGROUND ART

Gear commands of known type are generally mounted internally of the support connecting the levers of the brakes to the handlebars of the bicycle and generally comprise a rotating drum, having a rotation axis, which is rotated in opposite directions in order to cause a portion of a gear-activating cable to wind around the lateral surface of the drum. The cable can control the drive wheel gears or the centrally-mounted danger and exerts a force that, through a derailleur mechanism, is directed transversally with respect to the plane containing the transmission chain. This force translates the derailleur of the gear change more or less transversally with respect to the plane containing the transmission chain, so that the chain is moved between adjacent cogwheels mounted on the rotation pivot of the back wheel or the clanger.

Known-type commands further comprise means for rotating the rotating drum, on command and in opposite directions, in predetermined angular steps, and also comprise means for holding the rotating drum in position in the absence of commands on the means for rotation.

The means for rotating are constituted by a series of gears which transmit a couple between a lever, typically associated to a brake lever or constituted by the brake lever itself, and the rotating drum. The run of the lever or the activating lever and the transmission with the rotating drum are determined in such a way that each action on the lever corresponds to a determined rotation of the drum which is converted, through the activating cable, into a translation defined by the derailleur of the gear change mechanism.

The means for retaining generally comprise ratchet gears which, in the absence of commands, maintain the rotating drum in position. These means are necessary because the derailleur of the gear change, whether anterior or posterior, is provided with elastic means which exert an opposite force to the traction exerted by the activation cable.

Known-type commands exhibits some drawbacks. Firstly the rotation axis of the rotating drum is arranged parallel to the advancement direction of the bicycle. This creates a rather complex command architecture, in which both the means for rotating and the means for retaining are constituted by a high number of parts. The activation cable is caused to undergo considerable torsion in the tract thereof which goes from the rotating drum to the command lever, as it is wound in a transversal direction with respect to the rotation axis and exits the drum in a parallel direction to the rotation axis. This leads in particular to a fairly noticeable stiffness of activation of the gear change, and thus requires the use of elastic means and means for retaining which are able to exert considerable forces. Known type gear change mechanisms are in effect rather "hard" and noisy, due to the torsion the cable is subject to and the structural complication which means working with command torque that are unfavourable with respect to the torques of the resistant couples. The resistant couples have an arm that coincides with the radius of the rotating drum as the cable winds externally of the drum, while the activation couples have a smaller arm, as the gears defining the means for rotating are arranged, for reasons connected to their size, internally of the rotating drum.

The main aim of the invention is to provide a command for activation of a bicycle gear change which obviates the drawback in the prior art.

An advantage of the command is that it comprises a number of components which is notably lower with respect to the gear changes in the prior art.

A further advantage of the command mechanism is that it is considerably "softer" and quieter than known-type gear change mechanisms.

A further advantage of the invention is that the command mechanism is decidedly smaller in size than known-type mechanisms.

DISCLOSURE OF INVENTION

Further characteristics and advantages will better emerge from the following detailed description of a command for activating a gear change for a bicycle, made herein below with reference to the accompanying figures of the drawings, given purely by way of non-limiting example, in which.

With reference to the figures of the drawings, number 1 indicates in its entirety a command mechanism according to the present invention. The command mechanism comprises a cylindrical rotating drum 2, provided with a rotation axis x, predisposed to be activated to rotate in opposite direction in order to wind around its lateral surface (and unwind therefrom) a portion of an activation cable 3 of the gear mechanism. The command mechanism further comprises means for rotating which are predisposed to activate the rotating drum 2, on command, in rotation in opposite directions, according to predetermined angular steps. The command mechanism also comprises means for retaining which are predisposed to hold the rotating drum 2 in position in the absence of a command to the means for rotating. The rotation axis x of the rotating drum 2 is perpendicular with respect to the advancement direction of the bicycle, i.e. it is parallel to the rotation axis of the front wheel inasmuch as typically the command mechanism is mounted on the handlebars of the bicycle. Thanks to the special arrangement of the rotation axis x of the rotating drum 2, the portion of the cable 3 which winds and unwinds on and from the rotating drum 2 is always tangential with respect to the rotating drum 2, i.e. the cable 3, in proximity of the command mechanism, always lies on planes that are perpendicular with respect to the rotation axis x.

The means for rotating predisposed to rotate the rotating drum 2 on command in opposite directions at predetermined angular steps comprise a cylindrical cover 4 which is coaxial of the rotating drum 2 and rotating with respect to the rotation axis x. The cylindrical cover 4 is predisposed at least partially to close internally thereof the rotating drum 2, and is provided on a lateral surface thereof with a through-passage 4a and a maneuvering appendage 4b which projects about radially towards the outside of the cylindrical cover 4. The through passage 4a enables passage of the cable 3 which extends between the rotating drum 2 and the gear change, while the maneuvering appendage 4b, as will be better described herein below, has the function of a trigger, enabling a user to rotate the cylindrical cover 4 using a finger.

Also provided are means for realising a solid coupling in rotation between the cylindrical cover 4 and the rotating drum 2.

The means comprise a circular-developing frontal cogging 5, arranged internally of a first end surface 4c of the cylindrical cover 4, coaxially to the rotation axis x. The frontal cogging is solid in rotation with the cylindrical cover 4.

The means further comprise an internal radial cogging 6 which is solidly constrained to the lateral surface of the cylindrical cover 4 in proximity of a second end surface 4d of the cylindrical cover 4, and which is coaxial to the rotation axis x.

The means also comprise a second circular-developing frontal cogging 7, coutershaped to the first frontal cogging 5 and predisposed to enmesh therewith solidly in rotation in a single direction. The second frontal cogging 7 is arranged on an end surface of the rotating drum 2 coaxially to the rotation axis x, and is solid in rotation to the rotating drum 2.

The first frontal cogging 5 and the second frontal cogging 7, in a preferred embodiment, exhibit a "saw-tooth" shape. Each cog exhibits a flat front surface perpendicular to the drum rotation direction, and a surface portion, opposite the front surface, which is inclined with respect to the front surface. When the cogs enmesh, in one rotation direction the frontal surfaces of opposite cogs enter into reciprocal contact, solidly constraining the two coggings in rotation. In the opposite rotation direction, the front surfaces of the opposite cogs detach, while the inclined portions of surface run freely on one another without there being any rotation constraint between the two sets of cogs.

The means for enabling a solid rotation coupling between the cylindrical cover 4 and the rotating drum 2 also comprise a cogwheel 8, which is coaxial to the rotation axis x, solid in rotation with the rotating drum 2 and arranged on the opposite side of the rotating drum 2 with respect to the second frontal cogging 7. At least an idler wheel 9, associated to a support element 9a fixed in rotation with respect to the rotation axis x, is arranged in such a way as constantly to enmesh with the cogwheel 8. The idler wheel 9 is predisposed to enmesh on command also with the internal cogging 6. In a preferred embodiment, illustrated in the attached figures, two idler wheels 9 are included, arranged at diametrically opposite positions with respect to the cogwheel 8. In a non-illustrated preferred embodiment, the two idler wheels 9 are solidly constrained to the cylindrical cover 4 and constantly enmesh with the internal cogging 6, and can on command enmesh with the cogwheel 8.

Figure 1:
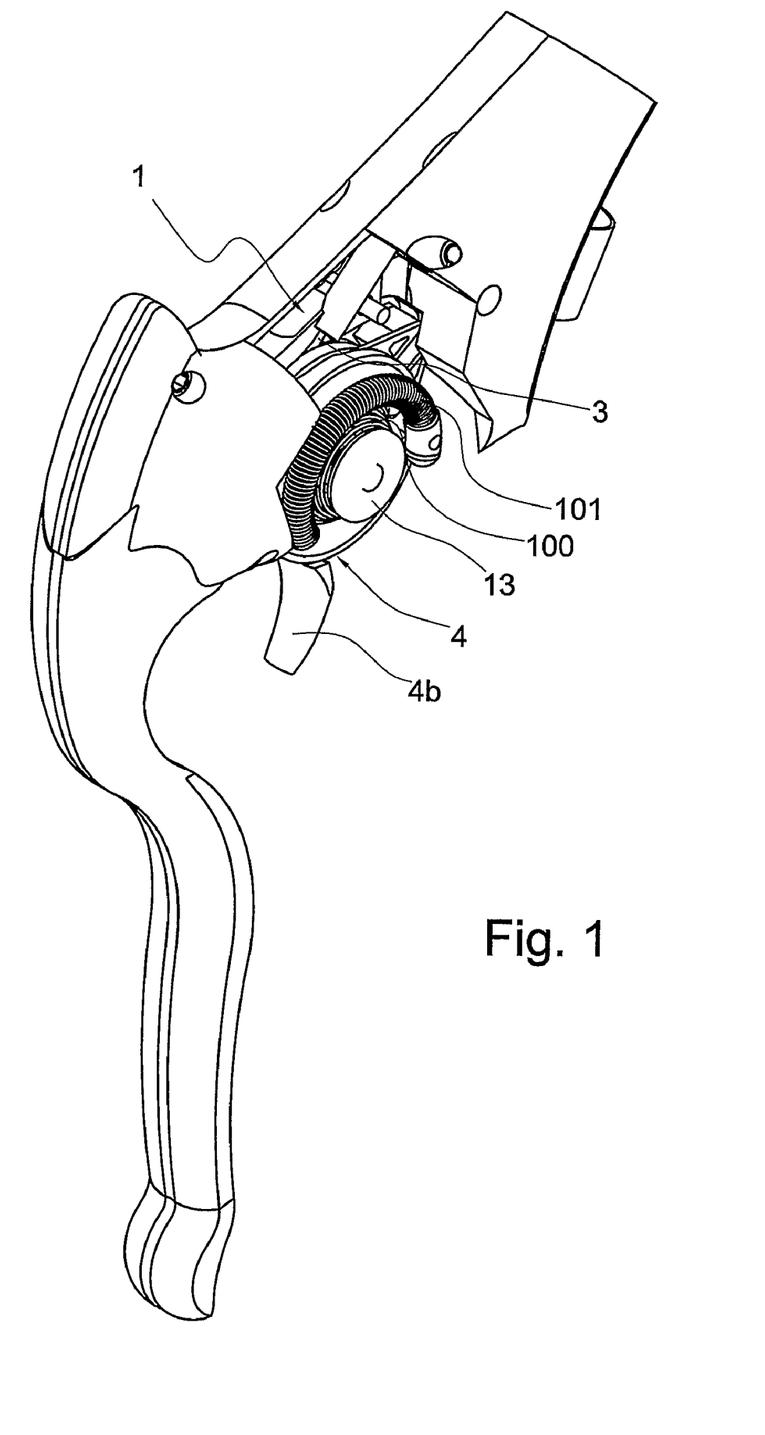
FIG. 1 is a schematic perspective view of a command mechanism of the invention, associated to the support of a brake lever.
Figure 2:
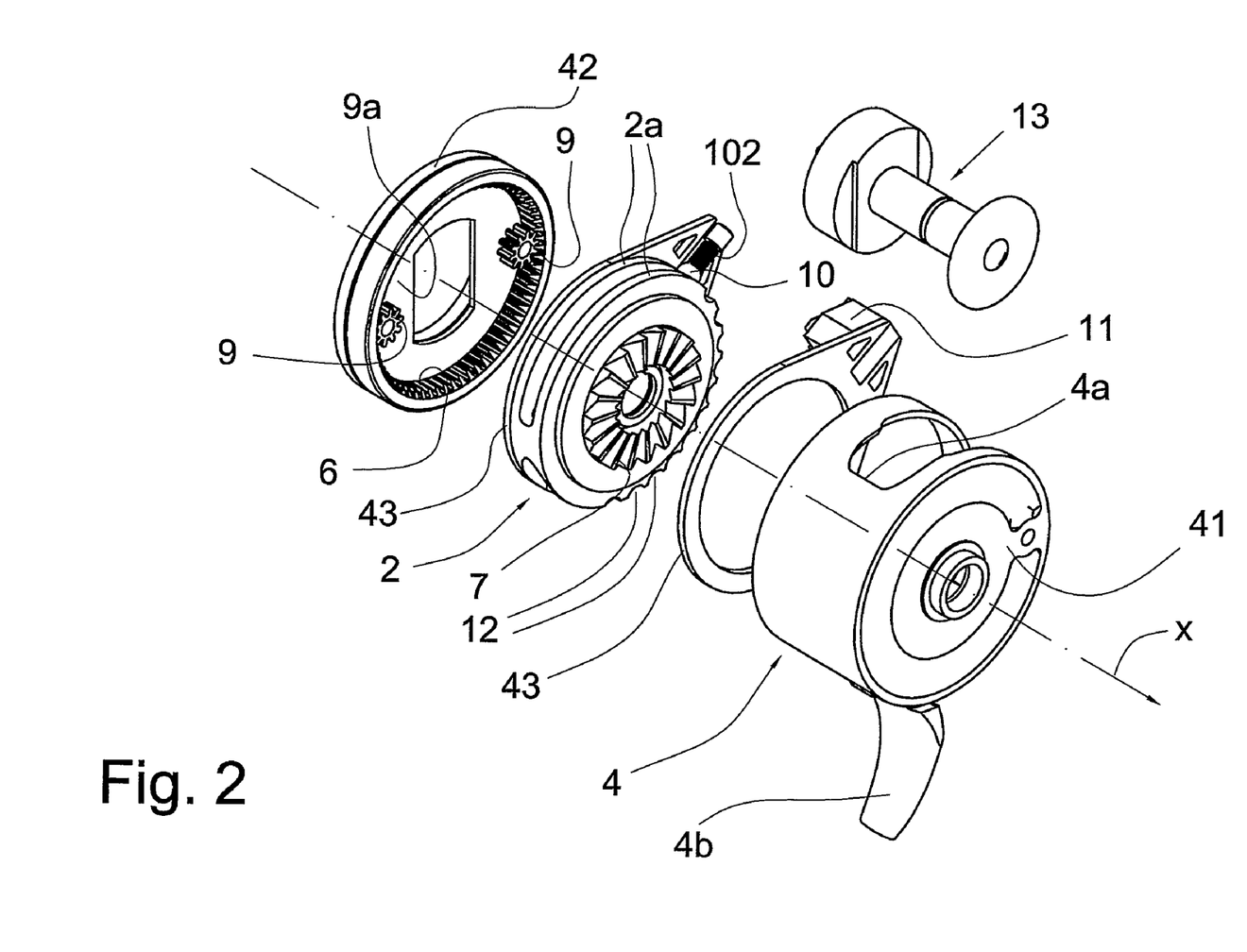
FIG. 2 is a first exploded view of the command of FIG. 1.
Figure 3:
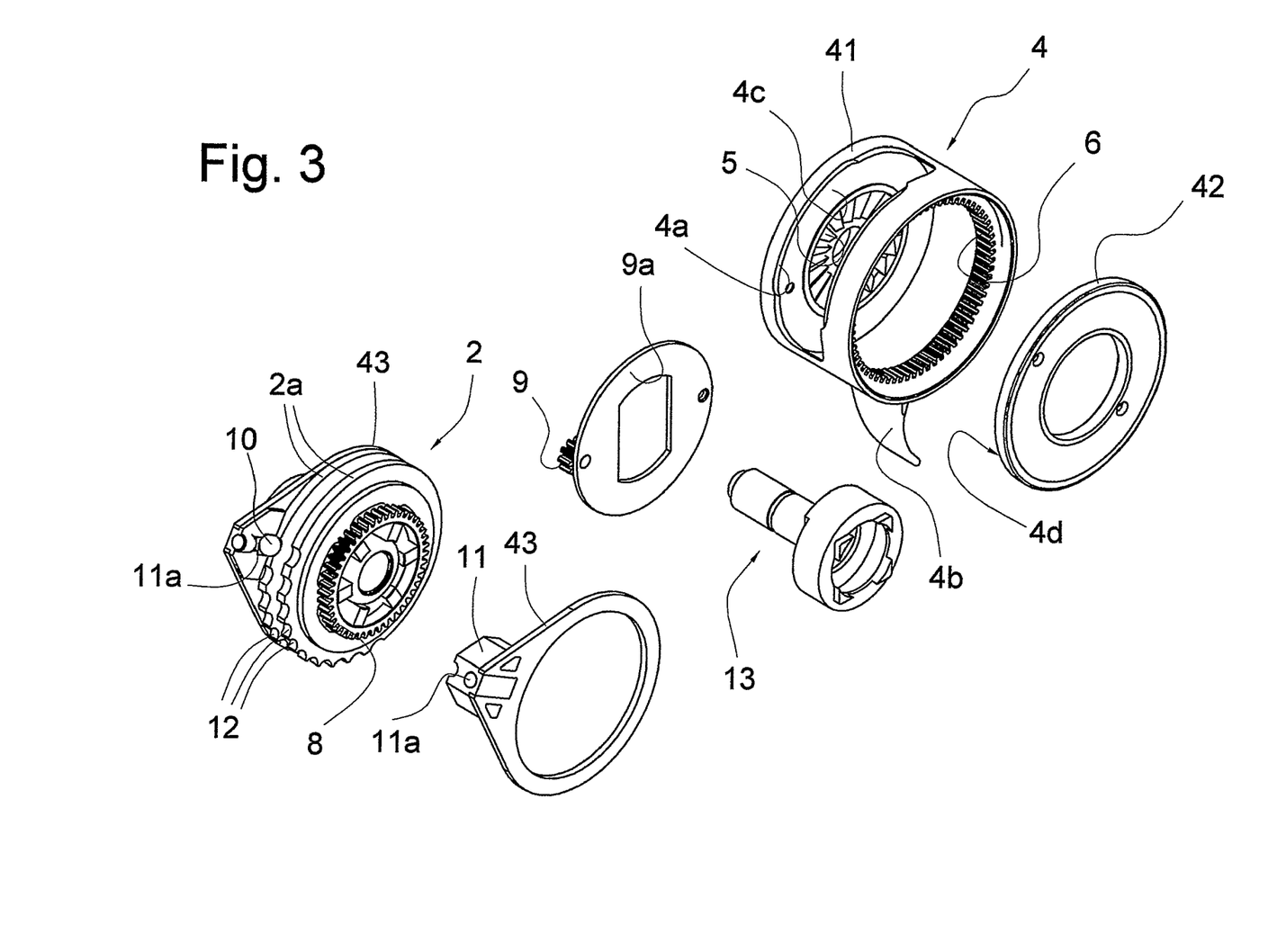
FIG. 3 is a second exploded view of the command mechanism of FIG. 1, illustrated in a different perspective.
Figure 4:
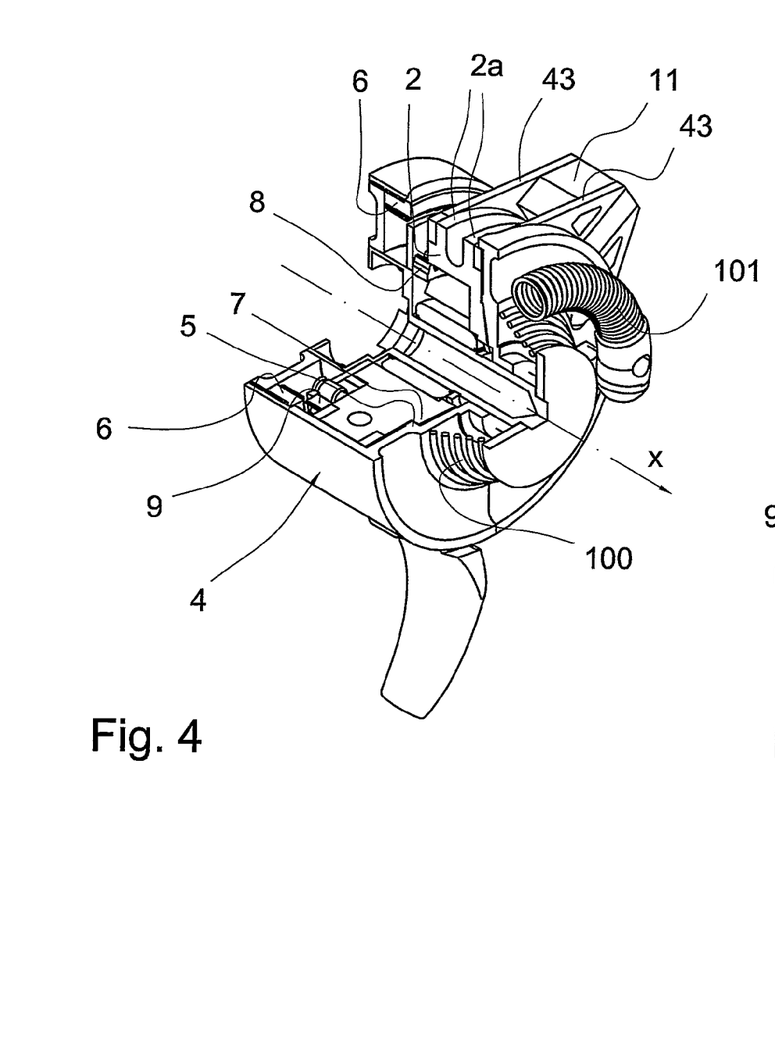
FIGS. 4 and 5 show the command of FIG. 1 in two different operative configurations.
Figure 5:
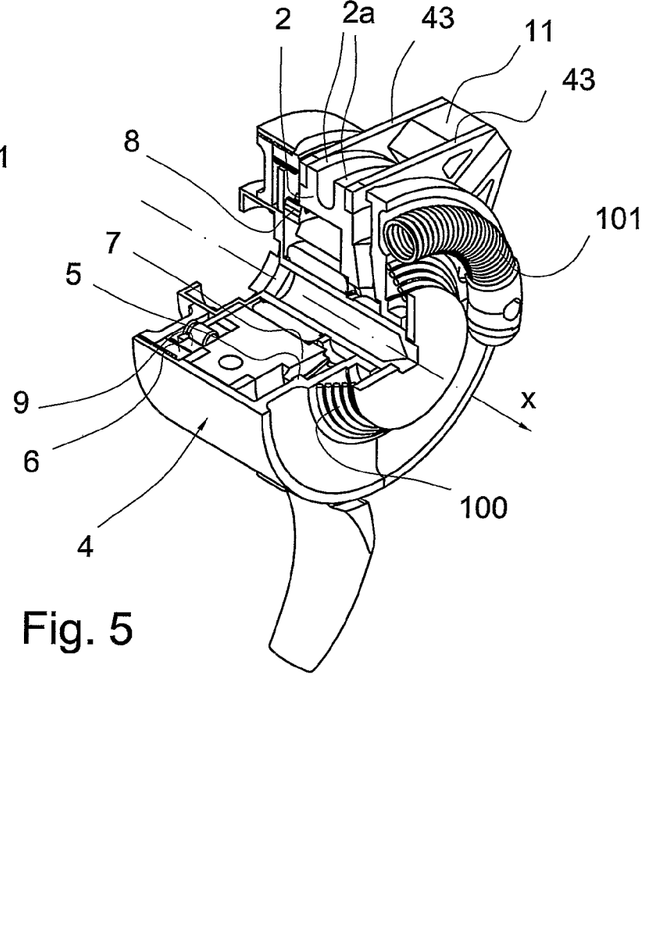

The cylindrical cover 4 is slidable on command along the rotation axis x between a first position (FIG. 4), in which the first frontal cogging 5 enmeshes with the second frontal cogging 7 and the internal cogging 6 does not enmesh with the idler wheel 9, and a second position (FIG. 5) in which the first frontal cogging 5 does not enmesh with the second frontal cogging 7, being distanced therefrom, and the internal cogging 6 enmeshes with the idler wheel 9 which is as above-mentioned enmeshed at the same time with the cogwheel 8. This is made possible by the size and arrangement of the various elements described: the distance that separates the first frontal cogging 5 from the internal cogging 6, measured along the rotation axis x, is greater than the distance that separates the second frontal cogging 7 from the idler wheel 9.

Also included are elastic means which, in the absence of a command, maintain the cylindrical cover 4 in one of the first and second positions.

In order fully to illustrate the functioning of the command mechanism of the present invention, the means for retaining the rotating drum in position 2 in the absence of a command on the rotation means will now be described.

They comprise at least a shaped element 10, which in a preferred embodiment is a spherical bearing, contained in a housing 11a made in a cage 11 solid in rotation with respect to the rotating drum 2 and the cylindrical cover 4. The shaped element 10 is predisposed to engage, by means of the action of an elastic means arranged in the housing 11a, in one of a plurality of chambers 12 made externally of at least a portion of the lateral surface of the rotating drum 2 and arranged at determined angular steps. In the preferred embodiment two shaped elements 10 are included, contained in respective housings 11a arranged parallel to one another and aligned with respect to the rotation axis x, and two series of chambers 12, defined by cylindrical sectors impressed transversally on two annular surface portions 2a that project radially on the lateral surface of the rotating drum 2 and are coaxial to the rotating drum 2. The housings 11a are constituted by cylindrical channels arranged radially with respect to the rotating drum 2 and open towards the rotating drum. The two shaped elements 10, or spheres, are pushed by the elastic means towards the outside of the housings in such a way that if the rotating drum 2 is in a suitable angular position the spheres penetrate at least partially internally of a respective chamber 12. The force with which the spheres are pressed in the direction of the chambers 12, which is radially directed with respect to the rotating drum 2, is sufficient to maintain the rotary drum 2 in the corresponding angular position.

The cylindrical cover 4 rotates on command about the rotation axis x between two extreme positions separated by an angular step so that, by rotating from a first to a second of the extreme positions, the cylindrical cover 4 induces on the rotary drum 2 a rotation which is sufficient at least to bring the shaped element 10 from a chamber 12 to an adjacent chamber 12. Elastic means are provided which maintain the cylindrical cover 4 in one of the extreme positions in the absence of a command.

In a further embodiment (not illustrated) the means for retaining predisposed to hold the rotating drum 2 in position in the absence of a command on the rotating means can be constituted by a friction device, i.e. a device which does not include engagement between various elements, but which exploits a friction determined between at least two surfaces. It is possible, for example, to include a friction surface arranged blow the cage 11 which interacts with the annular surface portions 2a of the rotating drum 2. In this case, obviously, the cage 11 does not internally contain the housings 11a.

Now we move on to illustrating the functioning of the command in relation to the preferred embodiment.

Let us consider that the rotation axis x is fixed with respect to the handlebars of the bicycle (the constructional details will be clarified hereinafter). The cylindrical cover 4 is maintained by the elastic means therefor in the first position (FIG. 4), in which position the first frontal cogging 5 enmeshes with the second frontal cogging 7 and the internal cogging 6 does not enmesh with the idler wheel 9. Pulling with a finger on the manoeuvring appendage 4b towards the handlebars, a rotation is induced by one determined angular step of the cylindrical cover 4 between the described extreme rotation positions. In the figures, this rotation is in the direction of the rotation axis x, indicated to simplify the present description The frontal coggings 5, 7, in this rotation direction, are solidly reciprocally constrained, so that the rotating drum 2 is drawn in rotation with the cylindrical cover 4, for example winding the cable 3. In performing this rotation, the chambers 12 translate with respect to the shaped elements or spheres 10. Supposing that at the start of rotation the spheres 10 are engaged in respective chambers 12, at the end of the rotation they will be engaged in chambers 12 one step along from before the rotation of the rotating drum 12. By releasing the manoeuvring appendage 4b, the cylindrical cover 4 returns to the initial position, after having made an oppositely-direction rotation with respect to the previous one, i.e. not in the direction of the rotation axis x. In this rotation direction, the frontal coggings 5, 7, freely run one on another, thus the rotating drum 2 is maintained in the position reached.

To unwind the cable 3 a rotation in the direction of the rotation axis x must be induced on the rotating drum 2. To obtain this result it is sufficient to translate the cylindrical cover 4 along the rotation axis x from the first position to the second position (FIG. 5), i.e. the position in which the first frontal cogging 5 does not enmesh with the second frontal cogging 7, being distanced therefrom, and the internal cogging 6 enmeshes with the idler wheel 9, which at the same time enmeshes with the cogwheel 8. The translation of the cylindrical cover 4 along the rotation axis x can be induced very simply by acting on the manoeuvring appendage 4b. In these conditions, a rotation of the cylindrical cover 4 in the direction of the rotation axis x induces a rotation in the other direction of the rotating drum 2, which will cause the cable 3 to unwind.

The interaction between the spheres 10 and the chambers 12 is the same as described herein above, obviously developing in the opposite direction. By releasing the manoeuvring appendage 4b, the cylindrical cover 4 is brought back into the first position with respect to the translation along the rotation axis x and at the same time it rotates in an opposite direction with respect to the direction of the rotation axis x, without interfering with the rotating drum 2. The unwinding of the cable 3 is thus obtained by pulling the manoeuvring appendage firstly slightly diagonally, then in a perpendicular direction with respect to the rotation axis x.

From a constructional point of view, the command mechanism comprises a support pivot 13 which is coaxial to the rotation axis x, on which the rotating drum 2, the cylindrical cover 4 and the support element 9a of the idler wheel 9 are mounted. The support pivot 13 is solidly constrained to a part of the bicycle, typically to the handlebars in proximity of a brake lever. The rotating drum 2 is solidly constrained to the pin 13 for displacements parallel to the longitudinal axis x, while it is free in rotation. The cylindrical cover 4, apart from being free in rotation between its extreme positions, is longitudinally slidable with respect to the pin 13 between the first and second positions. The support 9a to which the idler wheel 9 is associated in solidly constrained to the pin 13.

The cylindrical cover 4, in the preferred embodiment, it made of two parts a first portion 41, cylindrical and open at an end, and a second portion 42, provided with a central opening which enables passage of the support pivot 13 and is predisposed to be located at the open end of the first portion 41, closing it.

The cage 11, which in the preferred embodiment of the command mechanism, comprises two housings 11a, is maintained in position at a correct radial distance with respect to the rotating drum 2 by means of two shaped rings 43 which are arranged about the rotating drum 2 by a side and externally of the annular surface portions 2a. The cage 11 and a portion of the shaped rings 43 project externally of the cylindrical cover 4 through the passage 4a and are held in position with respect to the bicycle at one of these projecting parts. On one side the projecting parts strike against a surface which is solidly constrained to the handlebars, and on the other side, in the rotation direction of the rotating drum 2, the projecting parts are pressed towards the surface which is solidly constrained to the handlebars thanks to the elastic means. In this way the cage 11 can rotate, small rotations with respect to the rotations of the rotating drum 2 and the cylindrical cover 4, about the rotation axis x in order to compensate for any play in the cable 3.

The cable 3 in wound on the rotating drum 2 on the surface portion thereof comprised between the annular surface portions 2a. Means of known type are provided to enable hooking an end of the cable to the rotating drum 2.

The elastic means mentioned in the description are constituted by: a first helix spring 100, arranged between the cylindrical cover 4 and a part of the handlebars of the bicycle, which exerts a force directed along the rotation axis x that pushes the cylindrical cover 4 towards the first position; a second helix spring 101, also arranged between the cylindrical cover 4 and a part of the bicycle's handlebars, which exerts a torque about the rotation axis x which pushes the cylindrical cover 4 towards the first extreme rotation position; two helix springs 102, arranged internally of the housings 11a, arranged to exert a radial force with respect to the rotating drum 2 which pushes the spheres 10 towards the rotating drum 2.

With reference to FIGS. 6, 7, 8, 9, 10a, 10b, 10c, a description will follow of a further preferred embodiment of the command mechanism of the present invention.

Figures 6, 7:
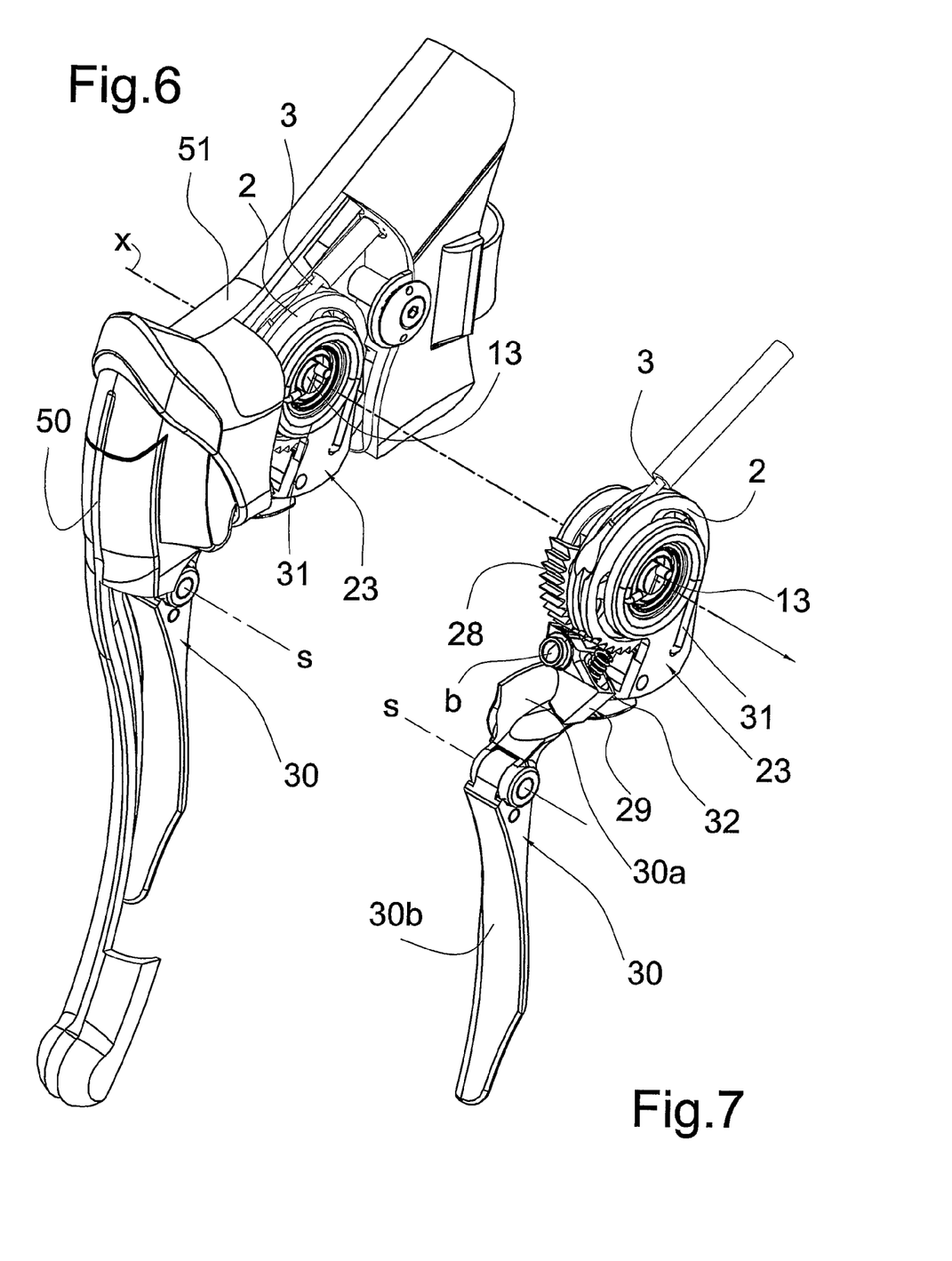
FIG. 6 is an overall view of a second embodiment of the command mechanism according to the present invention, associated to a brake lever.
FIG. 7 shows the command mechanism of FIG. 6, removed from the brake lever.

In the second preferred embodiment, the means for rotating, predisposed to rotate the rotating drum 2 in opposite directions according to determined angular steps, comprise a ratchet gear for rotating the rotating drum 2 in the winding direction of the cable 3. With reference to FIG. 7, the rotation direction of the rotating drum 2, which leads to a winding-on of the cable 3 onto the rotating drum, is an anticlockwise rotation, while in FIG. 8 the rotation is clockwise.

The ratchet gear comprises a first cogging 21, saw-tooth shaped and arranged peripherally of the rotating drum 2, and a pawl 22, an end of which is predisposed to engage with the first cogging 21.

A shaped element 23, constrained to the pawl 22, is predisposed to activate is the pawl 22 in translation along a direction which is tangential to the rotating drum 2. The shaped element 23 comprises two annular portions 23a, parallel to one another, which are connected by a connection portion 23b and which comprise the rotating drum 2 between them. Also in this second preferred embodiment of the command mechanism, the rotating drum 2 is mounted coaxially to a support pivot 13 which is coaxial to the rotation axis x of the rotating drum 2 itself. The annular portions 23a of the shaped element 23 are also arranged coaxially to the support pin 13 so that the shaped element 23 is rotatable about the rotation axis x.

The pawl 22 is rotatably constrained to the shaped element 23, in particular to the connection portion 23b thereof, at an opposite end to the end predisposed to engage to the first cogging 21. Elastic means, preferably a helix spring interpositioned between the connection portion 23b and the pawl 22, are predisposed to maintain the pawl 22 in contact with the first cogging 21. By rotating the shaped element 23 the pawl 22 is translated along a direction which is tangential to the rotating drum 2. The first cogging 21 and the pawl 22 are shaped and arranged so that with reference to FIG. 8 a rotation in a clockwise direction of the shaped element 23 translates the pawl tangentially to the rotating drum 2 in a direction in which the pawl 22 blocks in the first cogging 21. Thus the shaped element 23 and the rotating drum 2 are solid in rotation in a direction that causes the cable 3 to wind onto the rotating drum 2.

As regards the unwinding-direction rotation of the cable 3 from the rotating drum 2, the means for rotating predisposed to rotate the rotating drum 2 comprise elastic means 24, in particular a spiral spring associated to the rotating drum 2 and predisposed to rotate the drum itself in the direction of unwinding of the cable 3. An arresting mechanism 25 is activatable between a is stop configuration, in which rotation of the drum is prevented in the unwinding direction of the cable 3, and a release configuration in which the rotation by one determined angular step of the rotating drum is permitted, by effect of the action of the elastic means 24.

Figure 10A:
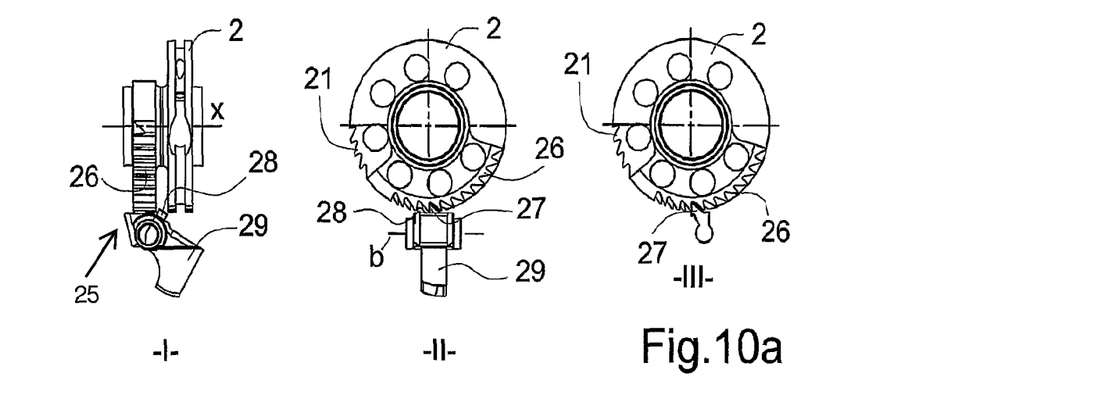
FIGS. 10a, 10b, 10c(I, II, III) show some stages of operation of the command mechanism relating to some elements of the command mechanism itself.

The arrest mechanism 25 comprises a second cogging 26, solid in rotation with the rotating drum 2. A stop cog 27 is mobile between a first position, in which it is engaged to the second cogging 26 and prevents a rotation of the rotating drum 2 in the unwinding direction of the cable (FIG. 10a), and a second position, in which does not engage with the second cogging (FIGS. 10b and 10c).

The arrest mechanism also comprises an oscillating cog 28, rotatingly constrained to the stop cog 27 about an oscillation axis, and free to rotate by a predetermined angle. The oscillating cog 28 is positioned, with respect to the stop tooth 27, in such a way that in the first position the stop cog 27 (FIG. 10a) does not engage with the second cogging 26, while in the second position of the stop cog 27 (FIGS. 10b and 10c), the oscillating cog 28 engages with the second cogging 26.

Figure 10B:
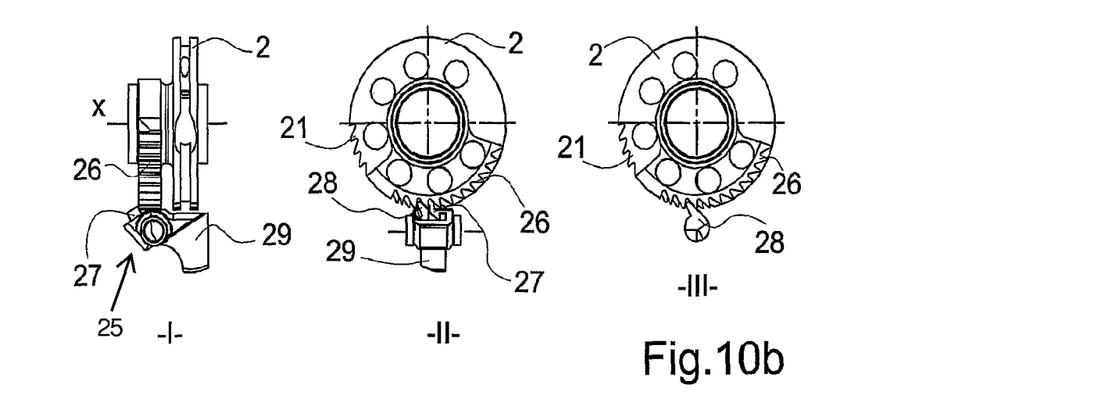
Figure 10C:
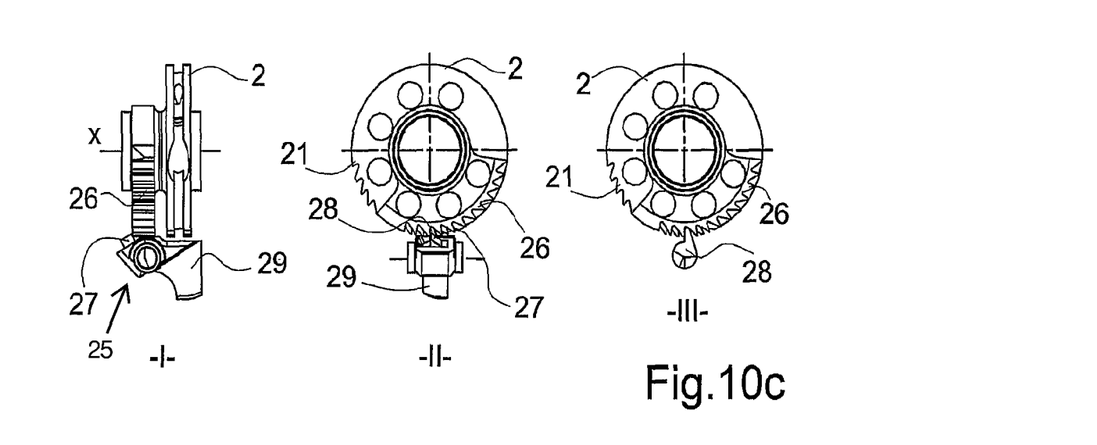

The oscillating cog 28 engages in the second cogging 26 at a first end of the rotation angle (FIG. 10b). The cog 28 is rotated by the rotating drum 2 up to a second of the rotation angle, at which it stops and also arrests the rotation of the rotating drum (FIG. 10c). Elastic means are predisposed to push the oscillating cog 28 to rotate from the second end towards the first end of the rotation angle.

As can be seen in FIGS. 9, 10a, 10b, 10c, the stop cog 27 is solidly constrained to a trigger 29 oscillating on command about an axis b. The oscillating cog 29 is rotatingly constrained to the trigger 29 so that, by rotating the trigger 29 bout its oscillation axis b, the stop cog 27 is displaced between its first and second position with respect to the second cogging 26, drawing the oscillating cog 28 with it. In FIG. 10a the stop cog 27 is shown in the first position.

By rotating the trigger about its oscillation axis b, the stop cog can be brought into the second position, illustrated in FIGS. 10b and 10c, in which it is not in contact with the second cogging 26. For a tract of the run of the stop cog 27 between the first and second positions, both the stop cog 27 and the oscillating cog 28 are in contact and engaged to the second cogging 26. In FIG. 10b the oscillating cog 28 is represented at a start stage of engagement of the oscillating cog 28 to the second cogging 26, in which it is at the first end of the rotation angle. In FIG. 10c the oscillating cog 28 is shown at an end stage of the engagement of the oscillating cog 28 to the second cogging 26, in which it is at the second end of the rotation angle. In the configuration of FIG. 10c the rotating drum 2 has made a rotation by an angle corresponding to the rotation angle made by the oscillating cog 28. The rotation angle of the oscillating cog 28 is such that, when the oscillating cog 28 is at the second end of the rotation angle, the second cogging 26 is in a position in which the stop cog 27, passing from the second to the first position, engages with the cog of the consecutive second cogging 26 with respect to the cog with which it was engaged at the start stage, illustrated in FIG. 10a, previously to the described sequence.

The activation of the means for rotating the rotating drum 2, both in the winding and in the unwinding directions of the cable 3, can be very simply performed using a shaped lever 30. The shaped lever 30 is rotatingly constrained to the shaped element 23 about the oscillation axis b of the trigger 29. The shaped lever 30 is solidly constrained to the shaped element 23 with respect to rotation about the rotation axis x and is also associated to the trigger 29 in such a way as to activate the trigger in rotation about its own oscillation axis b. Preferably the shaped lever 30 is solidly constrained to the trigger 29 with respect to rotation about the oscillation axis b of the trigger itself.

Figure 8:
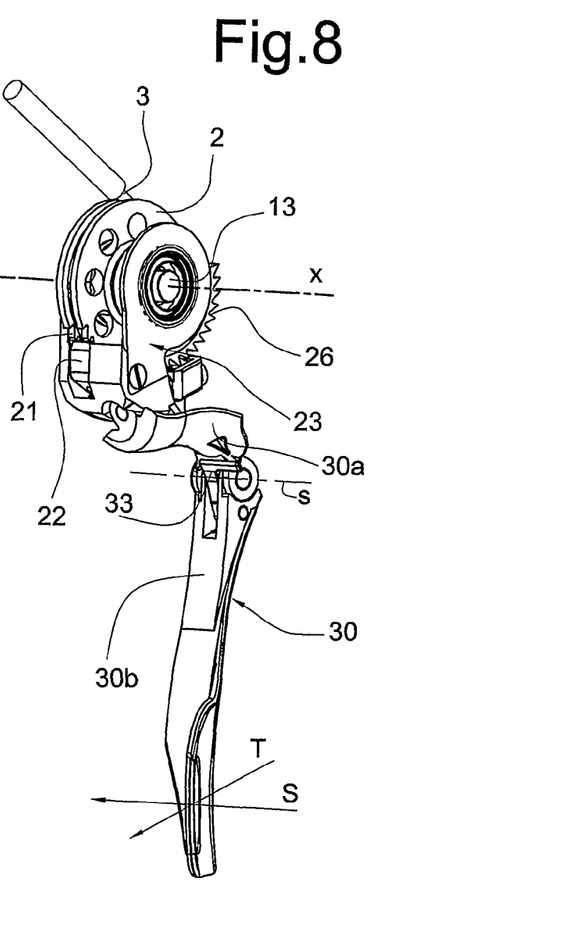
FIG. 8 shows a different perspective of the command mechanism of FIG. 6.
Figure 8A:
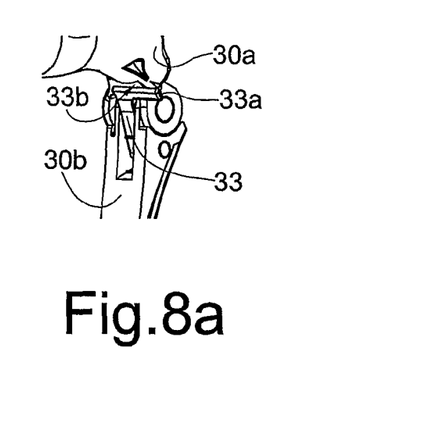
Figure 9:
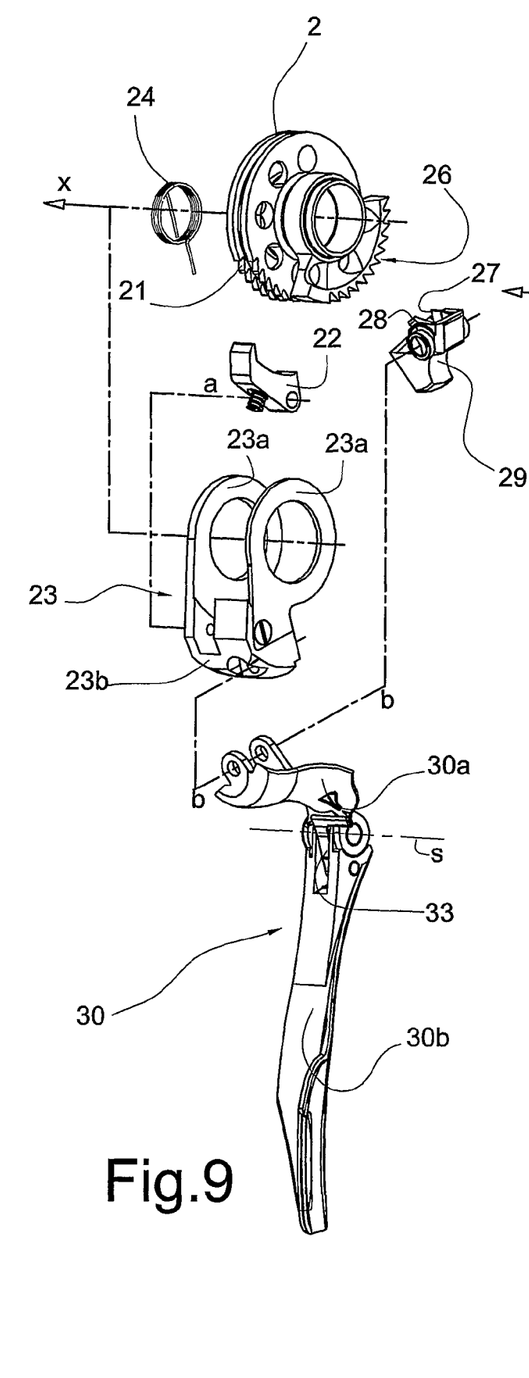
FIG. 9 is an exploded view of the command mechanism of FIG. 8.

With reference to FIG. 8, to rotate the rotating drum 2 in the cable 3 winding direction, it is sufficient to exert a force on the shaped lever 30 which exhibits at least one component which is parallel and directed equally to the force indicated by vector T. As the shaped lever 30 is solid in rotation with the shaped element 23 with respect to the rotation axis x of the rotating drum 2, the action of the force T induces a rotation in a clockwise direction of the shaped element 23 about axis x. The rotation of the shaped element 23, by means of the pawl 22 and the first cogging 21, is transmitted to the rotating drum 2, which is drawn in rotation about the axis x in a clockwise direction, i.e. in the cable 3 winding direction. Elastic means 31, preferably a spiral spring, are interpositioned between the shaped element 23 and the support pivot 13 and exert on the shaped element 23 an action which contrasts the rotation of the shaped element 23 in a clockwise direction. In the absence of force T, the spiral spring 31 rotates the shaped element 23 in anticlockwise direction up until it reaches a start position. The anticlockwise rotation of the shaped element 23 does not induce a corresponding rotation of the rotating drum 2 as the pawl 22, in this rotation direction, does not engage on the first cogging 21. The elastic means 31 can be substituted by any means able to exert on the shaped element 23 an action which is equivalent to an action exerted by the elastic means 31.

Still in reference to FIG. 8, to activate the rotating drum 2 in the cable 3 unwinding direction, i.e. in an anticlockwise direction, it is sufficient to exert on the shaped lever 30 a force which has at least one component which is parallel and same-directed as the force indicated by vector S. The action of force S induces a rotation of the shaped lever 30 and the trigger 29 about the oscillation axis b of the trigger itself which leads to the displacement of the stop cog 27 from the first to the second position. As mentioned above, in the second position the stop cog 27 is not engaged to the second cogging 26 which is engaged by the oscillating cog 28. The oscillating cog 28, which is free to rotate by a determined angle, is drawn in rotation by the rotating drum 2 by the push of the elastic means 24 up to a second end of the rotation angle at which it stops and also stops the rotation of the rotating drum 2. Elastic means 32, preferably a helix spring, are associated to the trigger 29 and are predisposed to exert an action which is opposed to the force S. In the absence of the force S the elastic means 32 bring the trigger 29 and the shaped lever into a start position in which the stop cog 27 engages with the second cogging 26, blocking the rotating drum 2 in position. The elastic means 32 can be substituted by any means able to exert on the trigger 29 and action which is equivalent to that exerted by the elastic means 32.

Advantageously the shaped lever 30 comprises two portions 30a, 30b, which are hinged to one another about an intermediate hinge axis s. Elastic means are predisposed to push the two portions 30a, 30b into a determined relative position, suitable for activation of the shaped lever 30. A blocking device is actionable between a configuration in which it prevents relative rotation between the two portions 30a, 30b, and a configuration in which it enables a relative rotation between the two portions 30a, 30b of the shaped lever 30.

The blocking device comprises a rod 33 which, at one end, is rotatingly constrained to one portion 30a of the shaped lever 30, the other end 30b being predisposed to engage in a seating 33b which is solidly constrained to the other portion 30b of the shaped lever 30a, 30b. The rod 33 is rotatable between a position in which it engages in the seating 33b and prevents relative rotation between the two portions 30a, 30b, and a position in which it does not engage in the seating 33b and enables relative rotation between the two portions 30a, 30b of the shaped lever 30. In the position in which it prevents the relative rotation between the two portions 30a, 30b, shown in FIGS. 8 and 9, the rod 33 functions as a strut between the two portions 30a, 30b. Elastic means are included for pushing the rod 33 into the blocking positioning which it prevents the relative rotation between the two portions 30a, 30b.

Advantageously the blocking device is activatable by means of an activating brake lever 50. Preferably the shaped lever 30 is arranged in such a way that when the brake lever 50 is rotated, the blocking device is brought by the activating lever 50 into the configuration in which it does not prevent relative rotation between the portions 30a, 30b of the shaped lever. In these conditions the lower portion 30b can be drawn in rotation with respect to the upper portion 30a of the shaped lever 30 by the brake lever 50.

In more detail, the brake lever 50 is predisposed to interfere with an appendage 33a of the rod 33. The activation of the brake lever 50 leads to a rotation of the rod 33 into the position in which it does not engage in the seating 33b and permits relative rotation between the portions 30a, 30b of the shaped lever 30.

The preferred arrangement of the shaped lever 30, and in general of the command of the invention, is illustrated in FIG. 6. The shaped lever 30 is brought adjacent to the external side of the brake lever 50. All the elements of the command which are activated by the shaped lever 30 are contained internally of the body 51 connecting the lever 50 to the handlebars of the bicycle. As can easily be deduced from FIG. 6, the shaped lever 30 can be activated by the cyclist's fingers when the hand grips the handlebars or the body 51. Traction of the brake lever 50 is not influenced by the presence of the shaped lever 30 which, thanks to the presence of the blocking device, is free to follow the rotation of the brake lever 50.

The gear change made of the present invention offers important advantages.

Firstly, the arrangement of the rotation axis of the rotating drum considerably limits the overall size of the command mechanism. The cable is not subject to twisting and deviations, apart from being wound about the rotating drum.

Thanks to this arrangement, the number of components required for the command to function is very much lower than in known-type command mechanisms. A further advantage connected to the special arrangement of the rotation axis of the rotating drum is that the command mechanism proposed is considerably "softer" and quieter than in known-type mechanisms.

The absence of high torque on the cable and the fact that the arm of the couple and resistance are about the same lead to a reduction of the forces required for activating the command mechanism.

The invention claimed is:

1. A command device for a bicycle gear change, comprising: a rotating drum (2) provided with a rotation axis (x) and being predisposed to rotate in opposite directions in order to wind at least a portion of a change-activating cable (3) on a lateral surface of the rotating drum (2); means for rotating, predisposed on command to rotate the rotating drum (2) in opposite directions according to predetermined angular steps; means for retaining predisposed to hold the rotating drum (2) in a position in absence of commands made to the means for rotating; wherein the rotation axis (x) of the rotating drum (2) is perpendicular with respect to an advancement direction of the bicycle, the means for rotation comprising elastic means (24), associated to the rotating drum (2) and predisposed to set the rotating drum (2) in rotation in an unwinding direction of the cable (3); a stop mechanism (25) being actionable between a stop configuration, in which it prevents rotation of the rotating drum (2) in an unwinding direction of the cable (3), and a release configuration, in which it enables a rotation of the rotating drum (2) in an unwinding direction of the cable (3), in a determined angular step, the stop mechanism comprising: a second cogging (26), solid in rotation with the rotating drum (2); a stop cog (27), mobile between a first position, in which it is engaged to the second cogging (26) and prevents rotation of the rotating drum (2) in the unwinding direction of the cable (3), and a second position, in which it does not engage with the second cogging (26); an oscillating cog (28), rotatingly constrained to the stop cog (27) about an oscillation axis and free to rotate by a determined angle; the oscillating cog (28) being positioned with respect to the stop cog (27) in such a way that, in the first position of the stop cog (27) the oscillating cog (28) does not engage with the second cogging (26), while in the second position of the stop cog (27) the oscillating cog (28) engages with the second cogging (26).

2. The command device of claim 1, wherein the means for rotating, predisposed on command to rotate the rotating drum (2) in opposite directions in determined angular steps, comprise a ratchet gear predisposed to rotate the rotating drum (2) in the direction of winding-on of the cable (3).

3. The command device of claim 2, wherein the ratchet gear and a stop mechanism (25) are activatable by means of a shaped lever (30).

4. The command device of claim 3, wherein the shaped lever (30) is rotatingly constrained to a shaped element (23) about the oscillation axis (b) of the trigger (29) in such a way as to rotate a trigger (29) about the axis (b) thereof, the shaped lever (30) being solidly constrained to the shaped element (23) with respect to rotation about the rotation axis (x).

5. The command device of claim 4, wherein the shaped lever (30) comprises two portions (30a, 30b) which are hinged one to another about an intermediate hinging axis (s).

6. The command device of claim 5, comprising a blocking device which can be activated between a configuration in which it prevents a relative rotation between the two portions (30a, 30b) and a configuration in which it consents relative rotation between the two portions (30a, 30b) of the shaped lever (30).

7. The command device of claim 6, wherein the blocking device comprises a rod (33) which, at an end thereof, is rotatingly constrained to a portion (30a) of the two portions of the shaped lever (30), and at another end thereof is predisposed to engage in a seating which is solidly constrained to the other portion (30b) of the two portions of the shaped lever (30a, 30b), the rod (33) being rotatable between a position in which it engages in the seating and prevents relative rotation between the two portions (30a, 30b), and a position in which it does not engage in the seating and enables the relative rotation between the two portions (30a, 30b) of the shaped lever (30).

8. The command device of claim 6, wherein the blocking device (33) can be activated by a brake lever (50), the shaped lever (30) being arranged in such a way that, when the brake lever (50) is rotated, the blocking device (33) is brought into the configuration in which it does not prevent a relative rotation between the portions (30a, 30b) of the shaped lever.

9. The command device of claim 8, wherein the blocking device is actionable by means of the brake lever (50), which is predisposed to interfere with an appendage (3a) of the rod (33) by rotating the rod (33) into the position in which it allows relative rotation between the two portions (30a, 30b) of the shaped lever (30).

10. The command device of claim 2, wherein the ratchet gear comprises a first cogging (21), with cogs thereof in a saw-tooth shape, which first cogging (21) is arrange peripherally to the rotating drum (2); a pawl (22), an end of which is predisposed to engage in the first cogging (21); a shaped element (23), constrained to the pawl (22) and predisposed to activate the pawl (22) to translate along a direction which is tangential to the rotating drum (2).

11. The command device of claim 10, wherein the pawl (22) is rotatably constrained to the shaped element (23) at an opposite end to an end thereof predisposed to engage with the first cogging (21).

12. The command device of claim 10, wherein the shaped element (23) is rotatable about the rotation axis (x).

13. The command device of claim 12, wherein elastic means are predisposed to maintain the pawl (22) in contact with the first cogging (21).

14. The command device of claim 1, wherein the oscillating cog (28) engages in the second cogging (26) at a first end of a rotation angle thereof and is drawn in rotation by the rotating drum (2) up to a second end of the rotation angle thereof, at which it stops and also stops a rotation of the rotating drum (2).

15. The command device of claim 14, wherein the elastic means are predisposed to rotate the oscillating cog (28) from the second end towards the first end of the rotation angle.

16. The command device of claim 1, wherein the stop cog (27) is solidly constrained to a trigger (29) which trigger (29) on command oscillates about an axis (b), the oscillating cog (28) being rotatingly constrained to the trigger (29), the trigger (29) being predisposed on command to activate the stop cog (27) in displacements between the first position thereof and the second position thereof.

* * * * *